(No Model.)
E. A. DE LISLE.
VEGETABLE BLACK.
No. 432,058. Patented July 15, 1890.
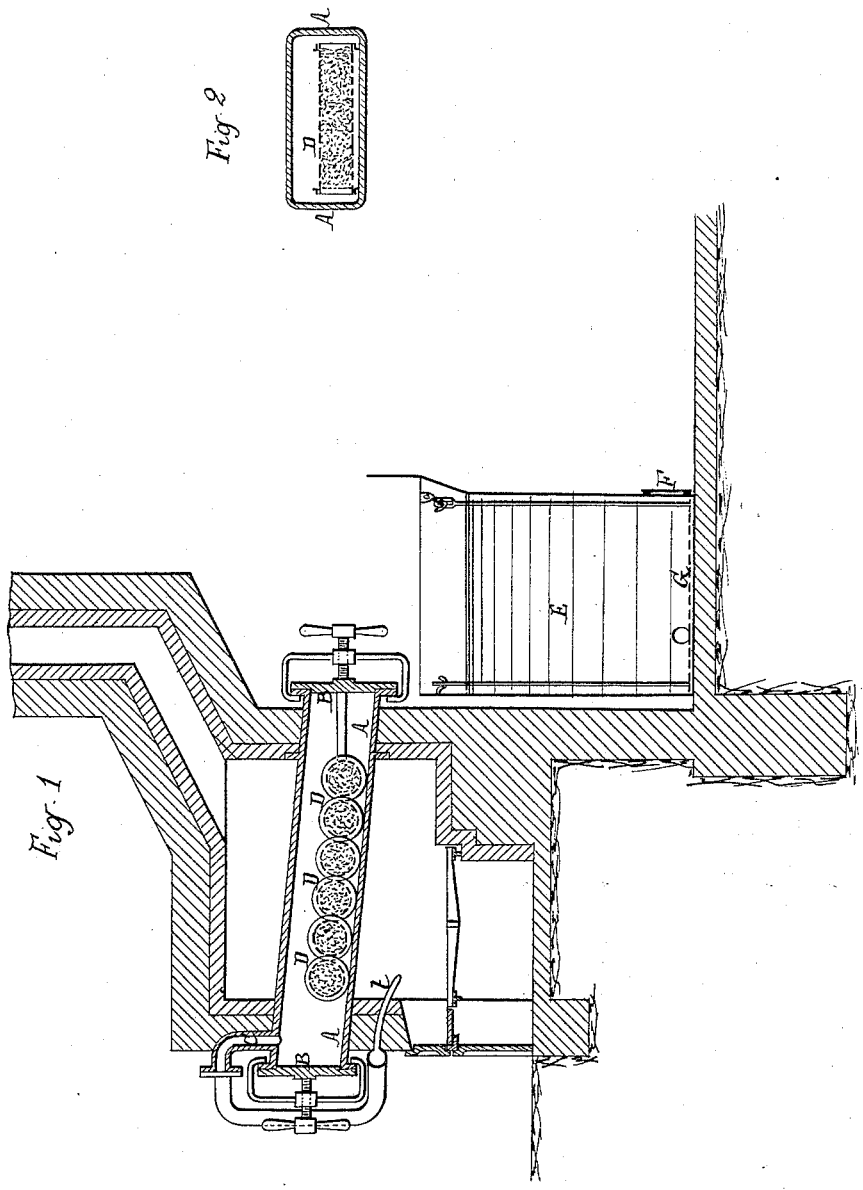
WITNESSES:
INVENTOR:
Emile Armet de Lisle,
By his Attorneys,

UNITED STATES PATENT OFFICE.

EMILE ARMET DE LISLE, OF PARIS, FRANCE, ASSIGNOR TO THE SOCIÉTÉ DU TRAITEMENT DES QUINQUINAS, OF SAME PLACE.

VEGETABLE BLACK.

SPECIFICATION forming part of Letters Patent No. 432,058, dated July 15, 1890.

Application filed July 13, 1888. Serial No. 280,446. (No specimens.)

*To all whom it may concern:*

Be it known that I, EMILE ARMET DE LISLE, of Paris, France, have invented certain new and useful Improvements in Vegetable Black, of which the following is a specification.

My invention consists in an improved vegetable black for decolorizing purposes obtained from the residuum of powdered cinchona-bark from which the quinine has been extracted. For making this black from this residuum of cinchona-bark the first step consists in reducing the residuum to a fine powder, and then it is calcined at a high heat in a close vessel, after having added to it a certain quantity of lime, say about fifteen or twenty per cent. The presence of lime during the calcination of the residuum of cinchona-bark is necessary in order to enable the calcinal residuum capable of decolorizing. This residuum of cinchona-bark from which the quinine has been extracted is particularly valuable for making a superior quality of vegetable black at a reduced expense in manufacture, since it already contains lime which had been added during the treatment of cinchona and the extraction of the quinine. The calcined material is cooled, either in the close vessel or, preferably, by casting the same into water while it is still at a high heat. There is then added to the water in the tank some hydrochloric acid for the purpose of dissolving the lime salts. In case, however, the cooling is effected in the close calcining-vessel, the powdered charcoal obtained is treated with dilute hydrochloric acid for the purpose specified. The charcoal thus treated is then thoroughly washed in water. The vegetable black which is obtained from the specified residuum of cinchona-bark possesses decolorizing power in much higher degree than animal black, and, on the other hand, this new black is completely pure and contains no calcareous salt. For calcining the powdered residuum mixed with lime and for obtaining my vegetable black I make use of any calcining-oven having a close vessel—such, for example, as that which is illustrated in the accompanying drawings, in which—

Figure 1 is a vertical longitudinal section of the oven. Fig. 2 is a transverse section through the close vessel.

This oven contains a brass retort A, hermetically closed at both ends by movable doors B B, which constitutes the close calcining-vessel. This retort inclines slightly from front to back, and it is provided at its forward end with a pipe C, through which escapes the gas resulting from the distillation. The gases which escape during the calcination of the residuum of cinchona-bark are due in the greater part to the mineral oil which was used in the treatment for extracting the quinine. The gases which thus escape from the retort reach the furnace through the pipe $t$ and are there consumed.

The material to be calcined is introduced in sheet-iron cylinders D, which are placed in the retort A. These cylinders are preferably perforated to facilitate the disengagement of the gases from the mass of the material. When the operation of calcining is finished, the door which closes the lower end of the retort is opened and the cylinders D, being then no longer supported in the retort, fall out into a tank E full of water. This tank is provided with an outlet for emptying the water and with a gate F for carrying off the black. The cylinders are removed when empty by raising the false bottom G. The same oven can be used for regenerating the vegetable black after it has been used.

I claim as my invention—

The herein-described vegetable black, which contains as its essential characteristic material the calcined residuum of cinchona-bark from which the quinine has been primarily extracted, substantially as set forth.

In witness whereof I have hereunto signed my name in the presence of two subscribing witnesses.

EMILE ARMET DE LISLE.

Witnesses:
  ROBT. M. HOOPER,
  ARMAND RITTER.